United States Patent [19]
Scott et al.

[11] 3,879,024
[45] Apr. 22, 1975

[54] MOUNTING DEVICE

[75] Inventors: Walter T. Scott, Huntingdon Valley; Frank J. Williams, Cheltenham, both of Pa.

[73] Assignee: Apex Molded Products Company, Philadelphia, Pa.

[22] Filed: Nov. 1, 1973

[21] Appl. No.: 411,958

[52] U.S. Cl. .................. 267/136; 403/220; 248/24
[51] Int. Cl. ............................................. F16f 7/12
[58] Field of Search .......... 403/220; 248/15, 18, 24, 248/21, 22, 358; 267/136, 137, 139, 140, 152

[56] References Cited
UNITED STATES PATENTS

| | | | |
|---|---|---|---|
| 1,828,402 | 10/1931 | Geyer | 403/220 |
| 2,641,434 | 6/1953 | Henshaw | 403/220 |
| 3,721,417 | 3/1973 | Skala et al. | 248/24 |
| 3,749,340 | 7/1973 | Williams et al. | 248/24 |

*Primary Examiner*—James B. Marbert
*Attorney, Agent, or Firm*—Roger Norman Coe; Thomas M. Ferrill, Jr.

[57] ABSTRACT

A vibrator isolator designed for universal mounting between a vibrating object and a supporting structure to provide resilient support and allow relative motion between a vibrating object and the supporting structure comprises a resilient rubber member, at least one attachment means bonded to the resilient member and coiled wire bonded inside the resilient member for retaining the attachment means in its bonded relationship to the resilient member.

10 Claims, 4 Drawing Figures

MOUNTING DEVICE

FIELD OF THE INVENTION

The present invention relates to mounting devices for reducing vibration, sound and shock transmission and more particularly, to vibration isolators designed to provide resilient support and allow relative motion between a vibrating object and a supporting structure.

BACKGROUND OF THE INVENTION

Vibration isolators are mounting devices which effectively reduce vibration, sound, and shock transmission. Typically, vibration isolators have threaded studs or inserts separated by a natural or synthetic rubber compound for high vibration absorption and low noise transmission. Such isolators resiliently support a vibrating object and allow relative motion to occur between the vibrating object and a supporting structure. Since use of vibration isolators provides many benefits, including increased efficiency, quiet operation, reduction of structural failures, protection of delicate components, and increased equipment life, vibration isolators have been used on virtually every type of machine or mechanism that vibrates. Typical applications involve electric motors, air conditioners, fans, blowers, compressors, pumps, refrigeration instruments, business machines, and the like.

Vibration isolators are suitable for use in compression loading applications. It has long been desired to have vibration isolators which could be used under tension loading, e.g., the vibration isolator being intermediate between a supporting structure and a vibrating object hanging in suspension. The suspension of a vibrating object in the horizontal plane using a vibration isolator has also been a desideratum of the art. In other words, the art has sought some means of using vibration isolators as universal mountings to effectively reduce vibration, sound and shock transmission and thereby achieve the benefits now obtained in compression loading applications.

Despite the fact that each stud and/or insert of a vibration isolator is bonded to the natural or synthetic rubber resilient portion of the isolator, existing vibration isolator construction has, as a practical matter, only had limited applications involving compression loading. Under tension or when subjected to shear conventional vibration isolators tend to fail due to separation of rubber and metal components. Even when a washer is bonded to the rubber compound to help retain the stud or insert in position, tension or shear loading can cause a peeling action to occur resulting in the separation of rubber and metal components.

The use of rivets or a bolt arrangement to connect opposing metal portions of vibration isolators would only tend to defeat the advantages of a vibration isolator when used under compression loading and would tend to limit, if not entirely defeat, any utilization of vibration isolators under tension or shear loading.

SUMMARY OF THE INVENTION

An object of the present invention is to provide an improved vibration isolator.

Another object of the present invention is to provide a vibration isolator which can be used as an universal mounting.

A further object of the present invention is to provide a resilient mounting device for vibration and noise elimination which can be used under either compression or tension loading.

Yet another object of the present invention is to provide means for preventing the separation of metal and rubber components of a vibration isolator under a wide variety of loading conditions.

In accordance with the present invention, vibration isolator mounting devices are specially designed for universal mounting applications to reduce vibration, sound, and shock transmission. Each mounting device comprises a resilient rubber body, means for attaching the resilient rubber body to a vibrating object, and a coiled wire arranged with respect to both the resilient rubber body and the attachment means such that the attachment means will not become separated from the resilient body when the apparatus is subjected to substantial tension loading by the vibrating object.

BRIEF DESCRIPTION OF THE DRAWINGS

Other and further objects, advantages and features of the invention will be apparent to those skilled in the art from the following detailed description thereof, taken in conjunction with the accompanying drawings, in which.

DESCRIPTION OF THE PREFERRED EMBODIMENTS

Figure 1:
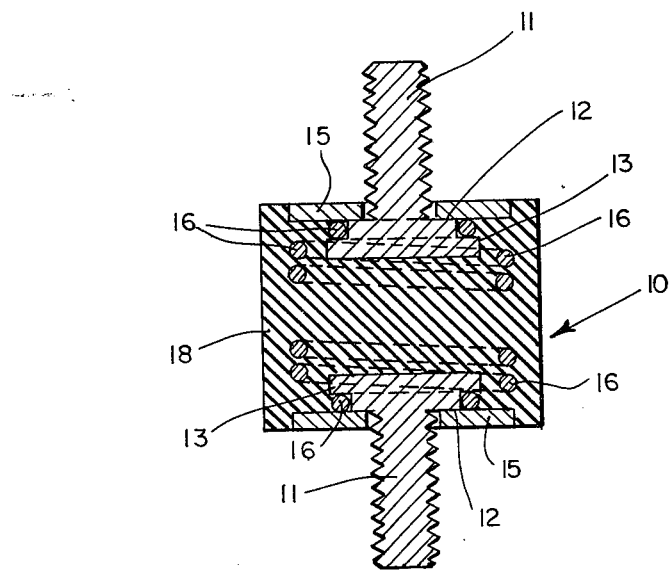
FIG. 1 illustrates, in cross section, the construction of a cylindrical vibration isolator in accordance with the present invention having threaded stud attachment means located at each end of the isolator.

Referring to FIG. 1, cylindrical vibration isolator 10, prepared in accordance with the present invention, is illustrated in cross section. Since the ends of the vibration isolator illustrated by FIG. 1 are identical, the following description is applicable to each end of the isolator. Attachment means 11, shown as a threaded stud, is located at the end of the vibration isolator and has two flanges 12 and 13, respectively, embedded in the resilient portion of the isolator. Flange 12 of attachment means 11 abuts up against metal washer 15, which is flush with the end of isolator 10. One end of coiled spring 16 is wrapped around the embedded end of attachment means 11 and is positioned between flange 13 and washer 15 while the other end of coiled spring 16 extends outwardly for a few turns toward the outer surface of vibration isolator 10. The resilient portion of vibration isolator 10 is made up of rubber 18 which is bonded under heat and pressure to flange portions 12 and 13 of attachment means 11, retaining means 15 and coiled spring 16.

The presence of coiled spring 16 provides overall reinforcement for the vibration isolator and tends to retain attachment means 11 in position even when vibration isolator 10 is subjected to shear and tension loading. Accordingly, the embodiment illustrated in FIG. 1 can be used as a universal mounting to reduce vibration, sound and shock transmission between a supporting structure and a vibrating object.

Figure 2:
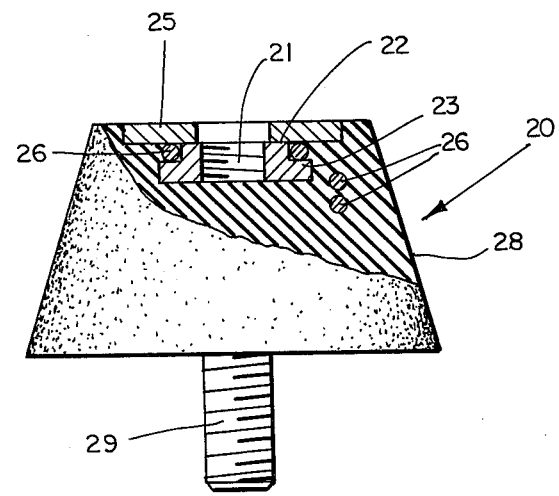
FIG. 2 illustrates, in partial cross section, a conical shaped vibration isolator in accordance with the present invention, having a threaded stud attachment means located at one end and a threaded insert attachment means located at the other end of the isolator.

In the embodiment of the present invention illustrated in FIG. 2 vibration isolator 20 is conical in shape and has a threaded insert 21 at one end with flange attachments 22 and 23. These flange attachments function in the manner indicated in connection with flange members 12 and 13 in FIG. 1. Specifically, flange member 22 retains threaded insert 21 against retaining member 25, which can be a metal washer. Flange 23, on the other hand, serves to form an abutting surface for spring 26 which is wrapped around a portion of threaded insert 21 adjacent to flange member 22 and between flange member 23 and retaining member 25. The remaining portion of spring 26 extends outwardly into resilient portion 28. Attachment means 29 at the other end of isolator 20 is a threaded stud member similar to those illustrated in FIG. 1.

Figure 3:
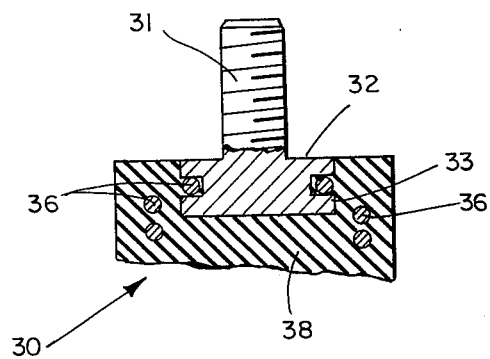
FIG. 3 illustrates, in cross section, a broken-away portion of one end of a rectangular shaped vibration isolator in accordance with the present invention in which separate retaining means has been eliminated.

Referring to FIG. 3, one end of isolator 30 is illustrated in which attachment means 31 is a threaded stud For a H-shaped end configuration, having flanges 32 and 33, which is bonded to the resilient portion of the isolator. For some applications the embodiment illustrated in FIG. 3 permits elimination of a separate retaining member, such as a washer, for maintaining the position of attachment means 31. The presence of spring 36, located at one end between flange members 32 and 33 and at the other end wound for a few turns in resilient portion 38 of isolator 30, tends to prevent any separation under loading of attachment means 31 from resilient portion 38.

Figure 4:
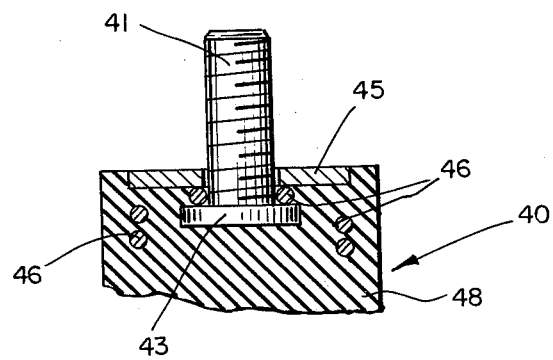
FIG. 4 illustrates, in cross section, a broken-away portion of one end of a vibration isolator in accordance with another embodiment of the present invention.

Another specific embodiment is illustrated in FIG. 4 in which only one end of isolator 40 is shown. In this embodiment attachment means 41 has only a single flange 43 embedded in resilient body 48 of the isolator. Spring 46 which, at least in part, is positioned between flange 43 of attachment means 41 and retaining member 45 retains the attachment means firmly in place even when vibration isolator 40 is subjected to loads in tension or compression.

Vibration isolators of the present invention can be made in any size or shape required to meet a particular need. Typically, vibration isolators vary in size from a molded portion about ¼ inch in diameter and about 9/32 inch long to a molded portion about 2 inches in diameter and about 1 11/16 inches long. While cylindrical and conical shapes are common shapes for vibration isolators, hexagonal, octagonal and other desired shapes can be employed.

The attachment means for a vibration isolator normally consists of a threaded stud or insert. Brass plated steel studs or inserts are often used for rust and corrosion resistance. In some applications solid brass components are utilized. It will be understood that vibration isolators can have multiple studs or inserts at each end if required.

The retaining member is usually a cold rolled steel washer, which typically is brass plated in the manner similar to the attachment means. obviously, other suitable materials can be employed. While the retaining member is commonly circular in shape, the retaining member can have an outer periphery which is square or any other suitable shape. As shown in FIG. 3 there are some circumstances where it is unnecessary to even have a retaining member.

The wire or spring of the present invention can be made of steel, brass, aluminum and similar materials. Preferably the spring is constructed to have a diameter which substantially fills the space between a flange of the attachment means and a retaining member. It will be understood that the spring could, if desired, be inserted through the end portion of the attachment means which is embedded in the resilient material rather than simply wrapped around the attachment means. The free end of the spring is preferably coiled one or more turns outwardly into the resilient material. The wire or spring effectively prevents separation of the attachment means from the resilient member under conditions which have previously resulted in separation. Moreover, the wire or spring accomplishes this desired result without detrimental reinforcement of the resilient member.

The resilient member can be composed of any material which will provide resilient support and allow relative motion between a vibrating object and a supporting structure. Natural rubber is typically used for this purpose although synthetic rubbers include neoprene, butadiene-styrene copolymers and the like can be employed. The resilient member is molded using conventional procedures following positioning of the other elements of the vibration isolators of the present invention.

Comparative tests made on mounting devices prepared in accordance with the present invention and the conventional vibration isolator demonstrated that the mounting devices prepared in accordance with the present invention had a 100 percent improvement in the breaking strength compared with the conventional vibration isolator.

From the foregoing, it will be seen that this invention is adapted to obtain all of the ends and objects hereinabove set forth, together with other advantages which are obvious and inherent. The vibration isolators of the present invention not only absorb vibration, reduce noise, dampen shock, eliminate stress, increase efficiency, and protect components, but provide these advantages in a wide variety of loading arrangements which have heretofore been impossible. Whereas vibration isolators have in the past been more or less restricted to applications involving compression loading, the mounting devices of the present invention can be subjected to significant tensile loading or shear loading without separation of rubber and metal portions.

Obviously, many modifications and variations of the invention as hereinbefore set forth can be made without departing from the spirit and scope thereof and therefore only such limitations should be imposed as are indicated by the appended claims.

What is claimed is:

1. A mounting device comprising:
   a resilient rubber member;
   at least one attachment means bonded to the resilient rubber member; and
   coiled wire bonded to the resilient rubber member; wherein each attachment means has at least one flange arranged with respect to one end of the coiled wire such that the coiled wire exerts force against the flange when the mounting device is subjected to tension loading.

2. The mounting device of claim 1 in which the resilient rubber member is natural rubber.

3. The mounting device of claim 1 in which the resilient rubber member is synthetic rubber.

4. The mounting device of claim 1 in which attachment means are present on two opposed sides of the resilient rubber member.

5. The mounting device of claim 4 in which at least one of said attachment means is a threaded stud.

6. The mounting device of claim 4 in which at least one of said attachment means is a threaded insert.

7. The mounting device of claim 1 which further includes at least one retaining member for each attachment means, each retaining member being located on the surface of the resilient rubber member and being bonded to the resilient rubber member.

8. The mounting device of claim 7 in which each retaining member is a metal washer.

9. Vibration isolator having a resilient rubber body; connecting means for attaching the resilient rubber body to another object; and coiled wire embedded in the resilient rubber body; said connecting means having at least one flange arranged with respect to the coiled wire such that the coiled wire exerts a force against the flange when the vibration isolator is subjected to tension loading.

10. A vibration isolator having a resilient rubber body, connecting means bonded to the resilient rubber body for attaching the vibration isolator to another body and means for retaining the connecting means to the resilient rubber body, wherein said retaining means comprises coiled wire bonded inside the resilient rubber body so as to retain the connecting means in an integral bonded relationship with the resilient rubber body under tension or compression loading.

* * * * *